Patented Jan. 17, 1950

2,494,880

UNITED STATES PATENT OFFICE 2,494,880

ALLYL BETA-ALLOXYPROPIONATE

Everett J. Kelley, Croyden, and Harry T. Neher, Bristol, Pa., assignors to Röhm & Haas Company, Philadelphia, Pa., a corporation of Delaware No Drawing. Application October 21, 1947, Serial No. 781,252

4 Claims. (Cl. 260—484)

This invention relates to a process for preparing allyl beta-alloxypropionate. More specifically, it relates to a process wherein an alkali hydracrylate and allyl halide are reacted at 70° to 150° C. and allyl beta-alloxypropionate is separated from the reaction mixture.

As an alkali hydracrylate, there may be used sodium or potassium hydracrylate. Other salts of hydracrylic acid which are soluble in an inert organic solvent may also be used. The salts are readily prepared by the alkaline hydrolysis of ethylene cyanohydrin.

As an allyl halide, there may be used allyl chloride or allyl bromide.

The reaction is preferably effected in the presence of one or more organic solvents, of which allyl alcohol, ethyl alcohol, butyl alcohol, benzene, and toluene are useful examples.

Typical examples of the preparation of allyl beta-alloxypropionate follow.

Example 1

A mixture of 80 parts by weight of a 50% aqueous solution of sodium hydroxide and 290 parts of allyl alcohol was placed in a reaction vessel and heated to 90° to 100° C. Ethylene cyanohydrin was slowly added thereto until a total of 75 parts of a 94% pure preparation of this material had been added. Ammonia was evolved. After all of the ethylene cyanohydrin had been added, the reaction mixture was heated under reflux for an hour. It was then cooled and diluted with benzene. The dilute mixture was then heated with distillation of an azeotrope which effectively removed the water. The water was separated in the condensate while the organic distillate was returned.

There was then added allyl bromide in an amount of 181 parts, and the resulting mixture was heated under reflux for four hours. The sodium bromide which had formed was separated by filtration, and the filtrate was distilled through a packed column. There was obtained below 107° C./26 mm. benzene, allyl bromide, and allyl alcohol. At 107°–109° C./26 mm. there was obtained a fraction of 94 parts which corresponded in composition to allyl beta-alloxypropionate.

Example 2

The procedure of Example 1 was followed with substitution of an equivalent amount of allyl chloride for the allyl bromide. After separation of sodium chloride, distillation of the liquid portion gave a yield of 54% of allyl beta-alloxypropionate coming over at 107° C./26 mm.

Example 3

The above procedure was followed, but the ratio of allyl chloride to sodium hydracrylate was increased from 3 to 2 up to 2 to 1 and the reaction was carried on at 125° to 135° C. The fraction corresponding to allyl beta-alloxypropionate was taken off at 107°–109° C./26 mm.

Example 4

The general procedure of the previous examples was followed with the reaction of nine moles of allyl chloride and six moles of sodium hydracrylate. The reaction between these compounds was carried on at 110° to 120° C. After separation of salt from the reaction mixture the liquid components were distilled under reduced pressure. The fraction collected at 93°–96° C./13 mm. corresponded in composition to allyl beta-alloxypropionate. Redistillation of this material at 66°–67° C./2 mm. gave a product having a bromine number of 23 (theoretical for allyl beta-alloxypropionate is 23.5) and a saponification number (without correction for a small trace of acidity) of 337 (theoretical acid number is 329.4).

The substitution of potassium hydracrylate for the sodium salt tends to give better yields, probably because of somewhat greater solubility of the potassium salt in the organic solvents which have been used.

Thus, by the simple reaction of a salt of hydracrylic acid and an allyl halide, there results both esterification and etherification. This invention, therefore, provides an expeditious way of forming allyl beta-alloxypropionate which is an effective polymerizing agent and which may be used in the copolymerization of ethenoids therewith to provide increased hardness and higher heat-distortion temperatures by reason of the cross-linking propensity of allyl beta-alloxypropionate.

We claim:

1. A process for preparing allyl beta-alloxypropionate which comprises reacting together under the influence of heat a salt of hydracrylic acid and an allyl halide.

2. A process for preparing allyl beta-alloxypropionate which comprises reacting together under the influence of heat an alkali metal hydracrylate and an allyl halide.

3. A process for preparing allyl beta-alloxypropionate which comprises reacting together under the influence of heat sodium hydracrylate and allyl bromide.

4. A process for preparing allyl beta-alloxypropionate which comprises reacting together under the influence of heat sodium hydracrylate and allyl chloride.

EVERETT J. KELLEY.
HARRY T. NEHER.

REFERENCES CITED

The following references are of record in the file of this patent:

UNITED STATES PATENTS

| Number | Name | Date |
|---|---|---|
| 2,296,823 | Pollack | Sept. 22, 1942 |
| 2,393,000 | Seeger | Jan. 15, 1946 |